(12) United States Patent
Kuhns

(10) Patent No.: US 8,207,984 B2
(45) Date of Patent: Jun. 26, 2012

(54) METHOD AND SYSTEM FOR TYPESETTING WITH MULTIPLE-COLOR CHARACTERS USING LAYER FONTS

(76) Inventor: Matthew John Kuhns, Lakewood, OH (US)

( * ) Notice: Subject to any disclaimer, the term of this patent is extended or adjusted under 35 U.S.C. 154(b) by 1009 days.

(21) Appl. No.: 12/218,791

(22) Filed: Jul. 21, 2008

(65) Prior Publication Data

US 2010/0013835 A1    Jan. 21, 2010

(51) Int. Cl.
*G09G 5/02* (2006.01)
*G06F 17/20* (2006.01)

(52) U.S. Cl. .................. 345/594; 345/593; 715/269

(58) Field of Classification Search .................. 345/593, 345/594; 715/269
See application file for complete search history.

(56) References Cited

U.S. PATENT DOCUMENTS

| | | | | |
|---|---|---|---|---|
| 6,057,858 | A * | 5/2000 | Desrosiers | 345/467 |
| 6,091,505 | A | 7/2000 | Beaman et al. | |
| 6,762,770 | B1 | 7/2004 | Opstad et al. | |
| 6,867,787 | B1 * | 3/2005 | Shimizu et al. | 345/629 |
| 6,870,535 | B2 * | 3/2005 | Hill et al. | 345/467 |
| 7,006,108 | B2 | 2/2006 | Perry et al. | |
| 2008/0129755 | A1 * | 6/2008 | Nakamura | 345/629 |
| 2009/0172524 | A1 * | 7/2009 | Sorenson | 715/269 |

OTHER PUBLICATIONS

Sara Froehlich."Text Effects in Illustrator CS—Multiple Strokes on Type." About.com. Oct. 14, 2008. <http://graphicssoft.about.com/od/illustrator/ss/sfstroketext.htm>.
Font Naming Issues. Apr. 12, 1993. pp. 5-16. Adobe Systems, Inc. San Jose, CA. <http://www.adobe.com/devnet/font/pdfs/5088.FontNames.pdf>.
Michael Doret. The PowerStation Font Family User Manual and Guide for 2 Color Typesetting. Jun. 2007. p. 3. Alphabet Soup Type Founders. Hollywood, CA. <http://michaeldoret.com/AlphabetSoup/PowerSta_Manual.pdf>.
"The LTR Federal Manual." LettError. Oct. 7, 2008. <http://www.letterror.com/catalog/fed/manual.html>.
Andreas Seidel."Sattler AS Specimen Web Version." Mar. 17, 2005. astype type foundry. Oct. 7, 2008. <http://www.astype.de/s/specimen/SattlerAS_web.PDF>.
"Sauna, a typeface for all sizes." Underware. Oct. 7, 2008. <http://www.underware.nl/site2/index.php?id1=sauna&id2=detailsdingbats>.
"PostScript Type 1 and Type 3 Fonts General Information." Jan. 4, 2007. Adobe Systems Inc. Oct. 7, 2008. <http://www.adobe.com/cfusion/knowledgebase/index.cfm?id=328509>.
"Bitmap fonts: Flavors of Bitmap Fonts." Sep. 3, 2007. Linotype GmbH. Oct. 7, 2008. <http://www.linotype.com/2712-15370/flavorsofbitmapfonts.html>.
"Font Formats, File Types and Q&A." Adobe Systems Inc. Oct. 7, 2008. <http://www.adobe.com/devnet/opentype/archives/font_formats.html>.
"About photofonts: Color Typography." Fontlab Ltd. Oct. 7, 2008. <http://www.photofont.com/photofont/about/color/>.
"About photofonts: Photofonts in print." Fontlab Ltd. Oct. 7, 2008. <http://www.photofont.com/photofont/about/print/>.
"Synchronizing Text Among Layouts (Cross-platform)." Mar. 30, 2005. Quark, Inc. Oct. 7, 2008. <http://www.quark.com/service/desktop/support/techinfo/view.jsp?faq_id=207>.

* cited by examiner

*Primary Examiner* — Jeffrey Chow

(57) ABSTRACT

One embodiment of a desktop publishing system including a typesetting software application, one or more families of layer fonts, and a layer font manager program. The layer font manager will automate the creation of copies of a text object selected within the typesetting application, and assign to those copies other fonts from the same layer font family as that of the original object. The layer font manager will additionally bind the original object together with the copies into a composite unit, keeping all copies precisely aligned. This embodiment will simplify the process of using layer fonts to set type with multiple-color characters.

2 Claims, 16 Drawing Sheets

FIG. 2 abcdefghijklmnopqrstuvwxyz
ABCDEFGHIJKLMNOPQRSTUVWXYZ
1234567890,./;'[]\<>`=~+?:"
{}|!@#$%^&*()

abcdefghijklmnopqrstuvwxyz
ABCDEFGHIJKLMNOPQRSTUVWXYZ
1234567890,./;'[]\<>`=~+?:"
{}|!@#$%^&*()

abcdefghijklmnopqrstuvwxyz
ABCDEFGHIJKLMNOPQRSTUVWXYZ
1234567890,./;'[]\<>`=~+?:"
{}|!@#$%^&*()

| DATABASE OF LAYER FONT FAMILIES |
|---|
| Bifur |
| Bifur A |
| Bifur B |
| Bifur C |
| Bifur D |
| Bifur E |
| Bifur F |
| Containment |
| Containment Sparkle |
| Containment Solid |
| Containment Shade |
| Containment Full |
| Heavyset |
| Heavyset Polkadots |
| Heavyset Outline |
| Heavyset Solid |
| Heavyset Extruded |
| PowerStation Block |
| PowerStation Block High |
| PowerStation Block |
| PowerStation Block Low |
| Rosewood |
| Rosewood |
| Rosewood Fill |

312 (Heavyset group)

METHOD AND SYSTEM FOR TYPESETTING WITH MULTIPLE-COLOR CHARACTERS USING LAYER FONTS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to computer typesetting and, more particularly, to the use and management of layer fonts in rendering glyphs with multiple colors.

2. Prior Art

The shapes of written language, at their most basic, are formed of simple strokes or dots. Therefore, characters (letters, numbers, punctuation, etc.) may be adequately represented by glyphs (shapes) of a single color for utilitarian purposes.

Nevertheless, the use of decorative lettering with multiple colors in individual glyphs is a long-established tradition. Such lettering is present in some of the earliest preserved examples of calligraphy. By the 19th century, printers employed "chromatic type" to produce multiple-color lettering; different versions of one character were printed on the same space, using different inks, creating a single composite character of multiple colors.

In the modern era, multiple-color lettering is frequently employed in both printed and electronic media, particularly for consumer-targeted graphics such as signs, packaging and advertising. Most of this lettering, however, must be custom-produced for each new design, because of the monochrome paradigm which generally prevails in computer typesetting.

Computer Typesetting

Typesetting—the process of arranging and styling text for publication—is today mostly carried out with the use of desktop publishing systems. A typical desktop publishing system includes a personal computer and specialized typesetting software. Operating system software installed on the computer, such as Mac OS X™ or Windows Vista™, provides an environment in which a user may install and run more-specialized software. Professional typesetting software may take the form of drawing applications, such as Adobe Illustrators, or page layout applications such as Adobe InDesign™ or Quark XPress™.

Desktop publishing systems are widely used by design professionals and others to compose documents with a variety of layouts, typefaces, and typographic effects, and to publish those documents to various printed-output devices or in electronic formats.

Most computer software, including typesetting application software, relies on font files for rendering text. A font file is an electronic document storing descriptions of a set of glyphs; a single font includes glyphs for a complete set of standard characters in one type style. Widely recognized fonts include Times Roman, Times Italic, Times Bold and Times Bold Italic, each of which is a distinct font. Some font files may combine a family of multiple related fonts, such as the varieties of Times, into a single file.

Computer fonts are produced by type designers, using special-purpose software applications, such as FontLab Studio, Fontographer, or FontForge. Type designers' studios are often referred to as foundries, in a legacy of the metal type of the pre-digital era.

Computer Font Formats

Broadly speaking, font files may be classified as bitmap fonts, scalable fonts, or a combination of the two. Bitmap fonts describe glyphs as patterns of pixels, or individual squares, within a grid. Bitmap fonts are mainly employed for display on electronic screens at a fixed size.

Scalable fonts use mathematical formulas to describe the lines and curves of a glyph. Scalable fonts may be enlarged to any size without losing sharp edges or smooth curves. For this reason, design and printing professionals rely almost exclusively on scalable fonts for printed text. Examples of commonly-encountered scalable font formats include Apple TrueType, Type 1, and OpenType™.

Nearly all of those font formats which are widely supported by desktop publishing software describe characters as single-color glyphs. Each individual glyph, whether described by bitmaps or mathematical formulas, is a solid shape which software applications use like a rubber stamp. Thus, characters may be assigned any of a variety of colors, but each individual character is always rendered with a single, solid color.

A few graphics software applications are capable of providing simple enhancements to the monochrome glyphs of standard fonts. Adobe Illustrator™, for example, can "fill" characters with smooth gradations between multiple colors, or with multiple-color patterns. Adobe Illustrator™ and select other applications can also render scalable font characters with an outline, distinct in color from the character's interior.

Generally speaking, however, the "rubber stamp" model prevails for all font formats commonly used in desktop publishing. This limits the use of multiple-color lettering to either simple effects (e.g. gradients, outlines), or else custom lettering designs which are laborious and time-consuming to create.

Alternative Font Formats

Various alternative font formats, introduced or proposed over the years, have supported multiple-color glyphs. As will be seen, however, all such alternative formats possess significant drawbacks.

The Photofont™ format developed by Fontlab Ltd., Inc., for example, supports glyphs with multiple colors. However, in addition to requiring the installation of special software, which is only compatible with a small number of applications, Photofonts are bitmap fonts. This generally restricts their usefulness to electronic display at a specific, small, size. Photofonts are also limited to specific color combinations inherent in the design of the glyphs, preventing their adaptation to other color schemes.

The same limitations of predetermined colors and non-scalable bitmap glyphs also apply to the Bitmap Distribution Format (BDF) developed by Adobe Systems Inc., and to the format described in U.S. Pat. No. 6,762,770 (2004) "Method and System for Representation of Color and Other Attributes in Bitmap Fonts", issued to Beaman and Opstad.

The Type 3 specification developed by Adobe Systems Inc., while permitting scalable multiple-color glyphs, shares the Photofont™ format's limitation of predetermined color combinations. The Type 3 format is also unsupported by currently-available desktop publishing software, making it impractical for most users and discouraging type foundries from developing new Type 3 fonts.

Another format for a multiple-color font is described in U.S. Pat. No. 6,057,858 (2000) "Multiple Media Fonts", issued to Desrosirers. This format, like that described in U.S. Pat. No. 6,091,505 (2000) "Method and System for Achieving Enhanced Glyphs in a Font", issued to Beaman and Opstad, describes a font format which would permit scalable letters with areas of distinct color in individual glyphs. These formats would also provide the option for an end user to determine the specific values assigned to a glyph's color variables.

No products employing these formats have been made available, however. Adoption of any new multiple-color, scalable font formats, including those of the aforementioned patents, will furthermore be hindered by substantial obstacles.

To be useful, a new font format will require type foundries to create, and users to purchase, new font files. A new font format will also require development of updates to both computer typesetting software and to the font authoring software used by type designers. Designers and developers face a "chicken-and-egg" dilemma, as the return on creating either new fonts or new software is uncertain, without the other first being in widespread use.

Further, whereas the OpenType™ format has achieved broad support since its introduction in 1997, it still defines glyphs as traditional monochrome shapes. A new scalable font format with support for multiple-color glyphs would introduce a feature unsupported by any current desktop publishing software. Therefore, such a format would likely require much more extensive effort to ensure compatibility with the software and hardware components of desktop publishing systems.

Layer Fonts

Type designers, thus largely limited to monochrome font formats, have nevertheless attempted to develop multiple-color typefaces using an alternative approach. In place of single multiple-color fonts, type designers have released families of "layer fonts" (sometimes referred to as chromatic, bicolor or multiple layer fonts). Examples of layer font families include Adobe Systems Inc's Rosewood™, International House of Fonts' Bifur, and astype's Sattler™.

Layer font families consist of multiple individual fonts, each of which contains the shapes for one distinct color variable. Used in concert, fonts from such a family simulate a composite multiple-color typeface.

Layer fonts rely on an end user, who must manually assemble the component color variables into composite multiple-color type. Many type foundries include illustrated instructions with layer fonts; usually, these instructions guide the user through one of two processes.

In the first process, the user must assign a font to one line of text, then copy that text, paste it directly atop the original, and assign to the new copy another font from the relevant family. The user must then repeat the process for each color variable included in the family.

In the second process, the user must enter a single character multiple consecutive times, then assign a different font to each instance of the character, and adjust spacing (kerning) between the letters so that characters overlap.

Limitations of Layer Fonts

Both of these methods have several drawbacks. They are nonintuitive, involving many extra steps not normally performed in computer typesetting. Creating multiple-color text by these methods is also labor-intensive, as is editing such text, since both processes result in objects which are difficult to work with; by relying on characters stacked directly atop one another, these methods make most components of the composite type difficult to access. This in turn hinders experimentation with different color combinations.

Existing attempts to solve the problems of layer fonts have been largely unsuccessful. The instructions provided by foundries such as Alphabet Soup, though helpful in explaining the primary methods for working with layer fonts, do not make the actual processes any simpler or more efficient.

The type foundry underware has introduced fonts (e.g. Sauna Dingbats) with built-in kerning values, partially automating the steps of overlaying each color component used in the second process, but this approach also leaves many problems unresolved.

Once characters are made to overlap by the second process, it is difficult to select one of them, without first separating them by restoring neutral kerning values. Performing this additional step (and reversing it, afterwards) significantly complicates changes to text, color and font layering order. Further, because this process still requires that a font be applied to nonconsecutive characters, changing the color value assigned to one fonts glyphs throughout an entire text would be slow and cumbersome. The user would need to select multiple individual characters throughout the text, then change the color of each, one by one.

BRIEF SUMMARY OF THE INVENTION

These and other drawbacks of the prior art are overcome, and additional advantages achieved, by a machine for setting type with multiple-color characters. The machine will include a personal computer, a typesetting application, at least one family of layer fonts, a database of layer font names organized by family, and a program for managing layer fonts.

The machine will facilitate the assembly and use of composite multiple-color type, using layer fonts. The composite type will be formed of multiple, single-color text objects stacked atop one another. Each object, set in a different font from a single layer font family, will contribute the shapes which comprise one color variable.

When a text object is selected within the typesetting application, and is set in a font named in the database of layer fonts, the layer font manager will display a palette listing all fonts in the relevant layer font's family. A user may then activate another font listed in the palette, prompting the layer font manager to create a new object, copied from the selected text but set in the activated font. The layer font manager will assemble the copy and the original text into a composite, managed group.

When such a group is selected, the palette will indicate which fonts are represented in the group, as well as display the text color of each object next to that object's respective font.

The layer font manager will maintain consistency in the text and typographic settings, excepting font or color, of all text objects within a managed group.

By selecting one active font from the palette list while working with a managed group, the user will prompt the layer font manager to select only the text assigned that font. By this means the user will be able to select, and then assign different color values to, any part of a composite text regardless of where the component text object is within the group. The layer font manager will also permit the user to reorder items within a managed group, by moving the respective font names within the palette.

The layer font manager will, additionally, keep decorative properties which may be assigned to a text object, such as backgrounds or borders, applied to a single object at the bottom of a managed group, regardless of how items may be added to, deleted from, or reordered within the group.

The machine will, through these features, provide a system for setting and managing multiple-color type which is intuitive, user-friendly and efficient, and which furthermore preserves compatibility with existing layer fonts and other software.

BRIEF DESCRIPTION OF THE SEVERAL VIEWS OF THE DRAWING

FIG. 2 illustrates, in pictorial form, a family of layer fonts intended for the creation of composite type with multiple-color characters.

FIG. 3 is a diagram illustrating listings within a database of layer fonts organized by font family.

Figure 1A:
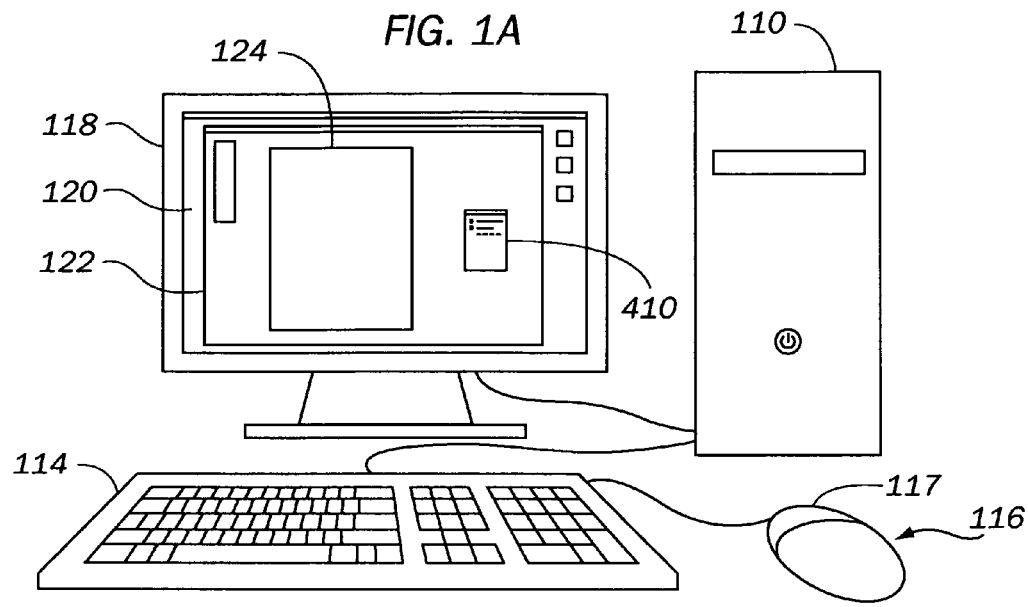
FIG. 1A shows, in pictorial form, a desktop publishing system which forms part of an apparatus for setting type with individual characters of more than one color.

GLOSSARY (Adapted from http://www.linotype.com/47/fontglossary.html and other sources)

Alphabet: All letters of a language. The English language alphabet has 26 letters.

Bitmap: A pattern of elements (e.g. pixels on a computer screen) which make up a character, graphic element, or image.

Character: The smallest component of a written language which has semantic value. A character is the abstract idea of the letter, numeral, symbol, etc.; a glyph is the specific shape, the form that you see on the page, screen, etc.

Chromatic type: Decorative metal or wood type from the second half of the 19th century. According to Ringwalt's *American Encyclopedia of Printing and Bookbinding* (1871): "type made of metal or wood for color printing and so arranged that there are duplicate or triplicate copies of each letter, which, after being printed, respectively, in different colors, on a given space, blend together in a harmonious whole"

Font: Traditionally, a complete set of characters for one typeface at one particular type size. In the following specification used, per familiar contemporary usage, as a synonym for "type style"

Font File: The technical transfer of a type style into a digital file, including the character set and the digital instructions contained in the font, such as the kerning values, hinting information, and type style name as well as other control information.

Font Family: Variants of different type styles, collectively combined under a joint family name. With a font family, individual type styles may vary in stroke width (e.g., Helvetica Roman, Bold, Black), slope (e.g., Helvetica Italic), width (e.g., Helvetica Condensed, Extended) embellishment (e.g., Helvetica Rounded), etc., yet have some underlying common design form that allows for a harmonious appearance when the type styles are used together.

Glyph: The shape of a written character. For example, a roman 'a', an italic 'a' and a small caps 'A' are three different glyphs representing the same character.

Kerning: Manual or automatic regulation of the spacing between two adjacent characters in a text, in order to improve letter fit. Traditionally, kerning characters were those which overhung their own width: in many typefaces, the Roman "f" has a kern to the right, the Roman "j" a kern to the left.

Layer Font: A type style designed for use with one or more other type styles from the same family to create text with individual characters which contain multiple colors. Layer fonts are effectively an electronic successor to Chromatic type. Each type style in a layer font family provides the shapes for one color variable; duplicate copies of a text, each set in a different type style from the layer font family and assigned a unique color, are overlaid directly atop one another to create composite multiple color text.

Pixel: Acronym for picture element. The smallest element in a raster image which can be turned on (printed) or off (not printed) to form an image (or bitmap) on a display screen or by any other form of digital output device.

Plug-in: A (usually small) piece of software which adds features to or enhances a larger piece of software. Plug-in architecture is employed so that a small piece of software may be loaded into memory by a larger program, adding a specific feature; users need only install the few plug-ins that they need out of a much larger pool of possibilities.

Resolution: Number of points or pixels per unit, usually measured in dpi (dots per inch) or P/cm (points per centimeter).

Scalable Font: A font which is defined mathematically and can be rendered at any size.

Type Style: One version of a font family, e.g. Helvetica Roman or Helvetica Bold is a type style.

Typography: The arts and sciences related to type: type design, typesetting, printing, kerning, and otherwise communicating with type.

DETAILED DESCRIPTION OF THE INVENTION

One embodiment of the present invention relates to computer typesetting and, more particularly, to the use and management of layer fonts in rendering glyphs with multiple colors. The following description is presented to enable one of ordinary skill in the art to make and use the related embodiment, and is provided in the context of a patent application and its requirements. Various modifications to the embodiment, and the generic principles and features described herein, will be readily apparent to those skilled in the art.

Components

One embodiment of the present invention consists of five main components: a personal computer 110, a typesetting software application 122, at least one family of layer fonts 119, a record of layer font families in an electronic database 310, and a layer font manager program 126.

Figure 1B:
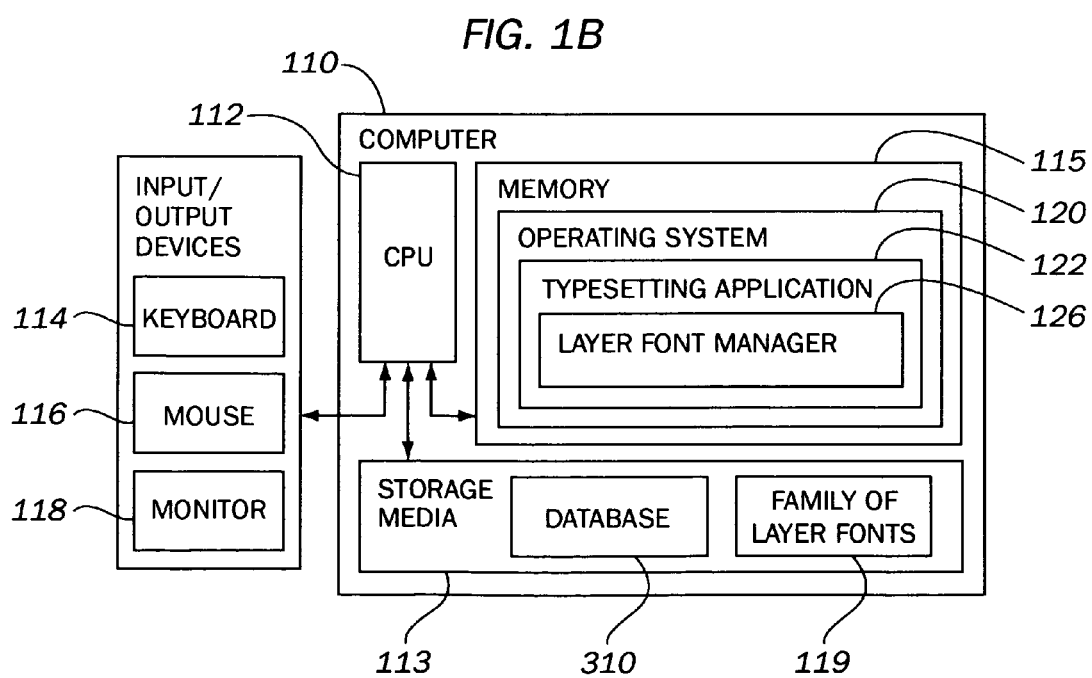
FIG. 1B is a block diagram illustrating an apparatus for setting type with individual characters of more than one color.

The personal computer 110 will be any system such as those sold by Apple, Inc., of Cupertino, Calif., or Hewlett-Packard, of Palo Alto, Calif. As illustrated in FIG. 1A and FIG. 1B, the personal computer 110 will include a central processing unit 112, memory 115 and storage media 113, as well as a keyboard 114 and mouse 116 for input, and a monitor 118 for output. Operating system software 120, installed on the computer, will manage other software and present a user with a graphical user interface via the monitor 118. Examples of operating system software include Mac OS X™, sold by Apple, Inc., and Windows Vista™, sold by Microsoft Corporation of Redmond, Wash.

The typesetting application 122 will be a program that can be installed and run within the operating system environment. Examples of typesetting applications include Adobe InDesign™, sold by Adobe Systems Inc. of San Jose, Calif., and Quark XPress™, sold by Quark, Inc. of Denver, Colo.

The typesetting application 122 will permit the creation of virtual documents which may be published to printed-output devices or in electronic formats. The typesetting application 122 will permit the user to create and manipulate objects, including text and graphic elements, within such a document 124. Text objects may take the form of single lines of text, or of blocks of text which flow onto multiple lines within the borders of a rectangular box or other shape.

Within a typesetting application document 124, every object will exist on a distinct layer. Objects on "higher" layers will conceal those on "lower" layers if sharing the same coordinates on the document's X (horizontal) and Y (vertical) axes. The typesetting application 122 will include the option to group two or more objects, such that selecting any object which is part of the group will automatically result in the selection of all objects in that group. The user may select one or more specific objects, from within such a group, by means of a special command.

At least one family of layer fonts 119 will be stored as electronic files on the computer's storage media 113, in a directory which the typesetting application 122 will access when generating menus of available fonts. An example of a family of layer fonts is depicted in FIG. 2.

The layer font manager 126 will, in one embodiment of the invention, be a program directly integrated with the typesetting application 122. When prompted by user input, the layer font manager 126 will issue commands to the typesetting application 122. By this means, the layer font manager 126 will manipulate objects and settings within a typesetting application document 124.

In another embodiment of the present invention, the layer font manager 126 might take the form of a third-party "plug-in," separate from the typesetting application 122. A plug-in version of the layer font manager 126 would run alongside the typesetting application 122, interacting with it in much the same way as the fully-integrated embodiment.

A database 310, stored on the computer's storage media 113, will contain the names of layer fonts intended for use as multiple-color composite typefaces. The database 310 will record the font names from each family of fonts within a distinct family listing 312. FIG. 3 illustrates an example of such listings. The layer font manager 126 may replace this database 310 with updated versions, for example by accessing a server connected to the World Wide Web.

Recognition of Layer Fonts

Figure 4:
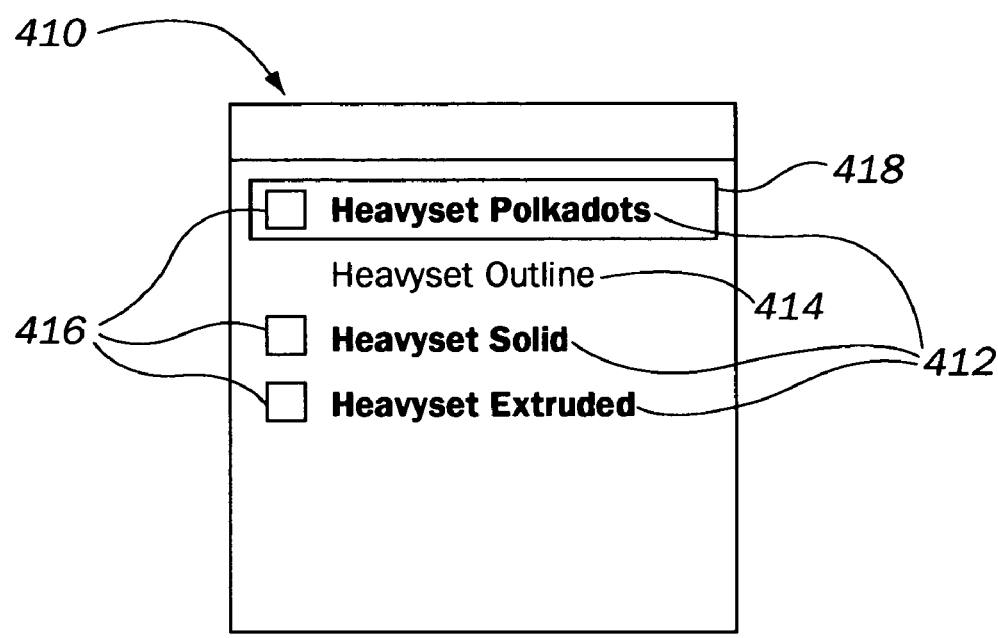
FIG. 4 is a user interface for displaying information about, and manipulating, text objects set in layer fonts intended for the creation of composite type with multiple-color characters.

The layer font manager 126 will, while operating, display on the monitor 118 a user interface in the form of a palette 410, or window, shown in FIG. 4. The palette 410 will, as detailed throughout this specification, display information about layer fonts applied to text objects selected by the user. The palette 410 will also provide a convenient means for the user to manipulate those objects, in creating and working with composite, multiple-color text.

Figure 5:
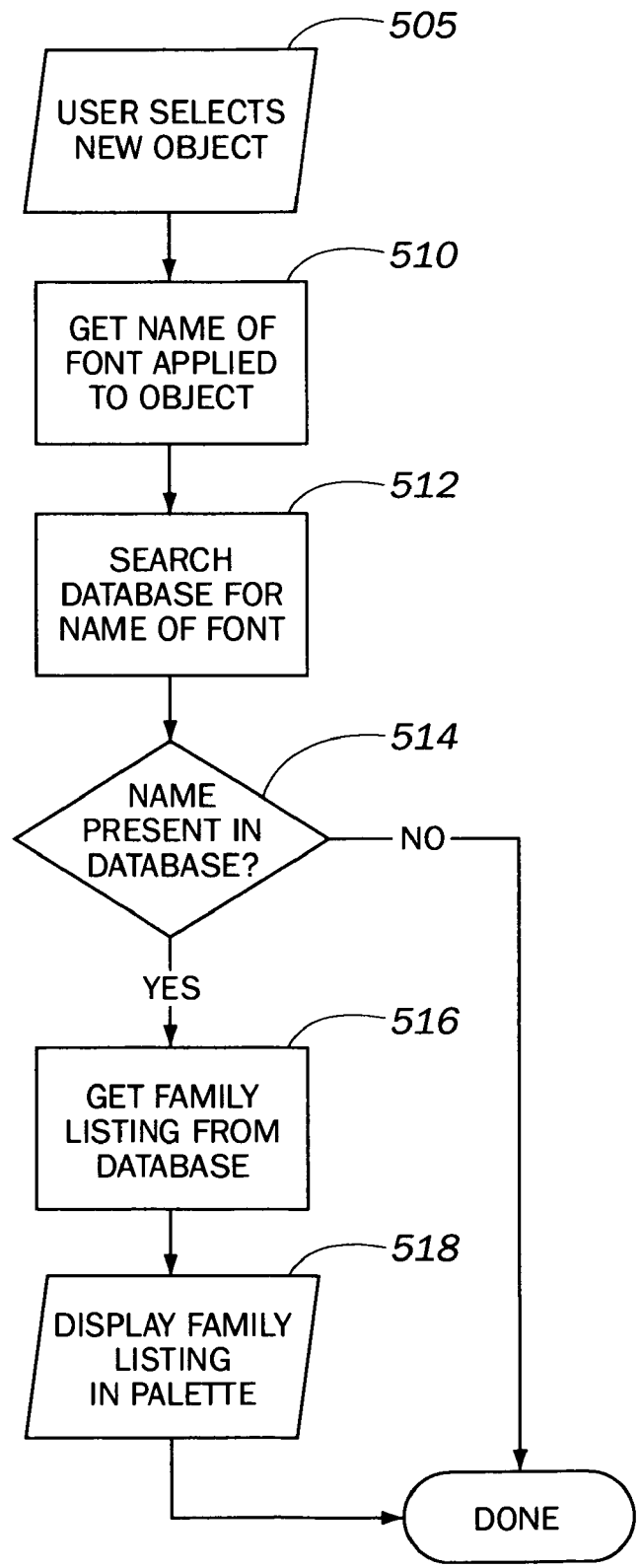
FIG. 5 is a flow diagram illustrating a process of determining when to display a listing of all fonts from the family of a currently selected font.

As depicted in FIG. 5, each time the user selects a new text object (step 505), the layer font manager 126 will examine the font applied to that text (step 510). The layer font manager 126 will then compare the name of the selected font with the font names in the database 310 (step 512).

If the currently selected font matches a font named in the database 310 ("YES" branch of step 514), then the layer font manager 126 will retrieve the family listing 312 in which the selected font is named (step 516). The layer font manager 126 will display the fonts from that family listing 312 in the palette 410 (step 518). If the currently selected font is not named in the database 310 ("NO" branch of step 514), then the palette will appear blank.

As depicted in FIG. 4, the name of the selected object's font will be displayed in the palette 410, as an active font item 412, indicated by bold weight type. The other listed fonts will initially be displayed as inactive font items 414, indicated by regular weight type.

The layer font manager 126 will also display, in the palette 410, a small, square swatch 416 next to each active font item 412. The text color of an object will be displayed in the swatch 416 next to that object's font. The layer font manager 126 will not display a swatch 416 next to an inactive font item 414.

Creating Copies of Text Objects

If the user has selected a line or block of text within a typesetting application document 124, and the text is set in a layer font named in the database 310, then the user may create and manage copies of the text through interaction with the palette

Figure 6:
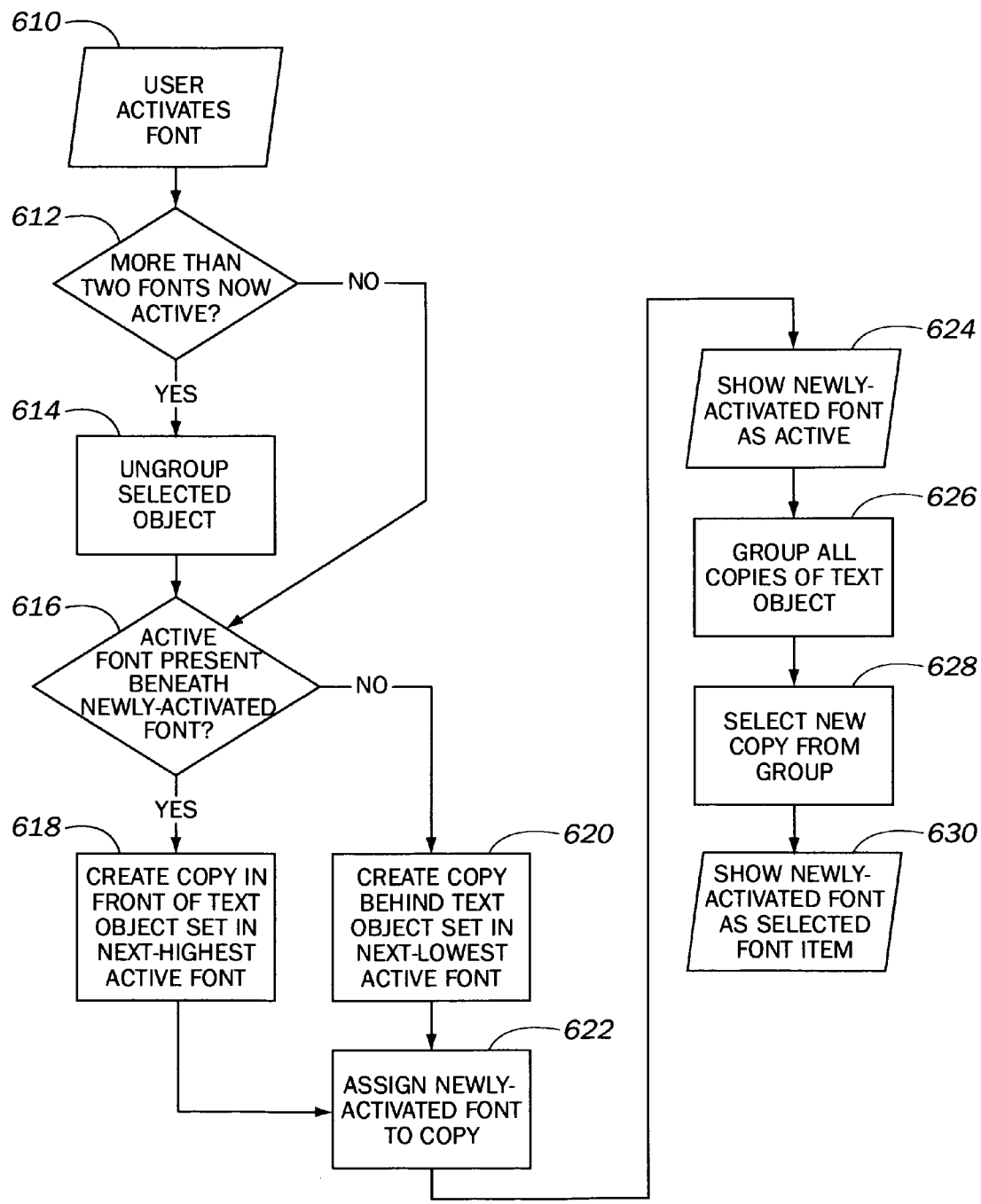
FIG. 6 is a flow diagram illustrating a process of creating a copy of a text object, and assigning to it a related font, for the purpose of creating or adding to a unit of composite type with multiple-color characters.

410. FIG. 6 depicts the process by which the layer font manager 126 creates copies in response to user input.

To create copies of a selected text object through the layer font manager 126, the user will activate (by double-clicking with the mouse 116) any inactive font item 414 in the palette 410 (step 610). The layer font manager 126 will then compare the relative position, within the palette 410, of the newly-activated font and the font of the already-existing text object (step 616).

If the newly activated font is above the font of the already existing text object, then the layer font manager 126 will generate an exact copy of the existing text object in front of the original (step 618). If the newly activated font is in a lower position, then the layer font manager will generate the copy behind the original text object (step 620).

The layer font manager 126 will apply the newly-activated font to the new copy (step 622). The palette 410 will then display the font of that copy as an active font item 412 (step 624).

Next, the layer font manager 126 will group the original text object and the new copy (step 626). This will ensure that if the topmost copy is moved, all other copies within the composite unit will be moved likewise and, thus, keep all elements of the multiple-color composite text aligned as intended.

The layer font manager 126 will select, from this group, the newly-created copy (step 628). In this way, the layer font manager 126 will automatically provide the user with an opportunity to assign a distinct color value to the additional color variable provided by the newly-activated font.

Finally, the layer font manager 126 will mark the font of the new copy as a selected font item 418 (step 630), by highlighting it in the palette 410. This will assist the user in determining which part or parts of a group are currently selected.

By selecting a group of two or more text objects, as would result from this process, and then activating another inactive font item 414 in the palette 410, the user will cause the layer font manager 126 to generate an additional copy as described above. When a group already exists ("YES" branch of step 612), however, the layer font manager 126 will first ungroup the already-existing objects (step 614), then regroup them along with the new copy (step 626) after it has been added.

Figure 7A:
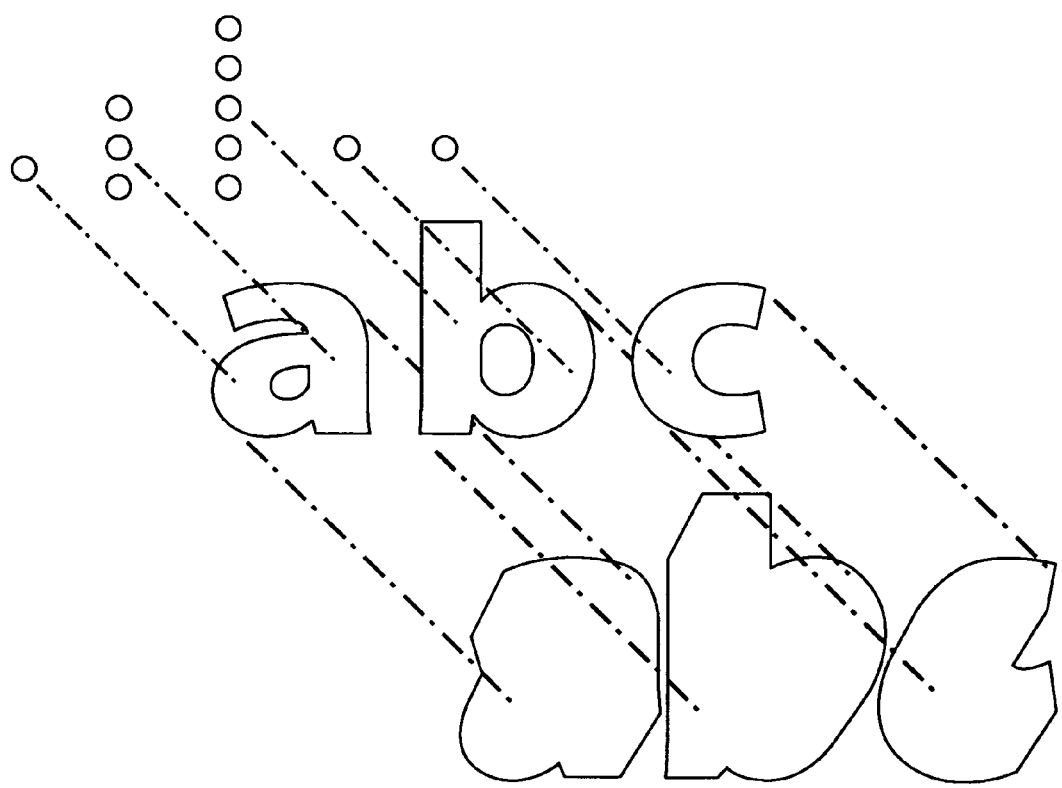
FIG. 7A illustrates, in pictorial form, objects forming a unit of composite type with multiple-color characters, in exploded view.
Figure 7B:
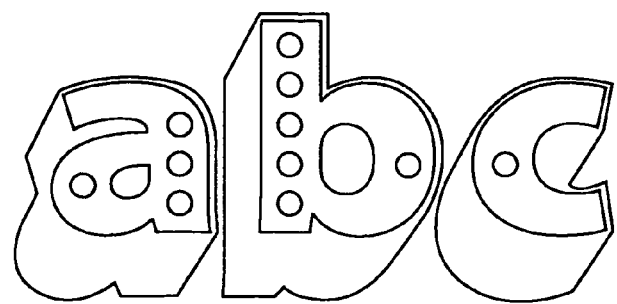
FIG. 7B illustrates, in pictorial form, objects forming a unit of composite type with multiple-color characters, as normally seen by a user.

FIG. 7A illustrates a group of three text objects, as could be created by the layer font manager 126, in an exploded view; FIG. 7B depicts the composite text seen by the user.

Figure 8:
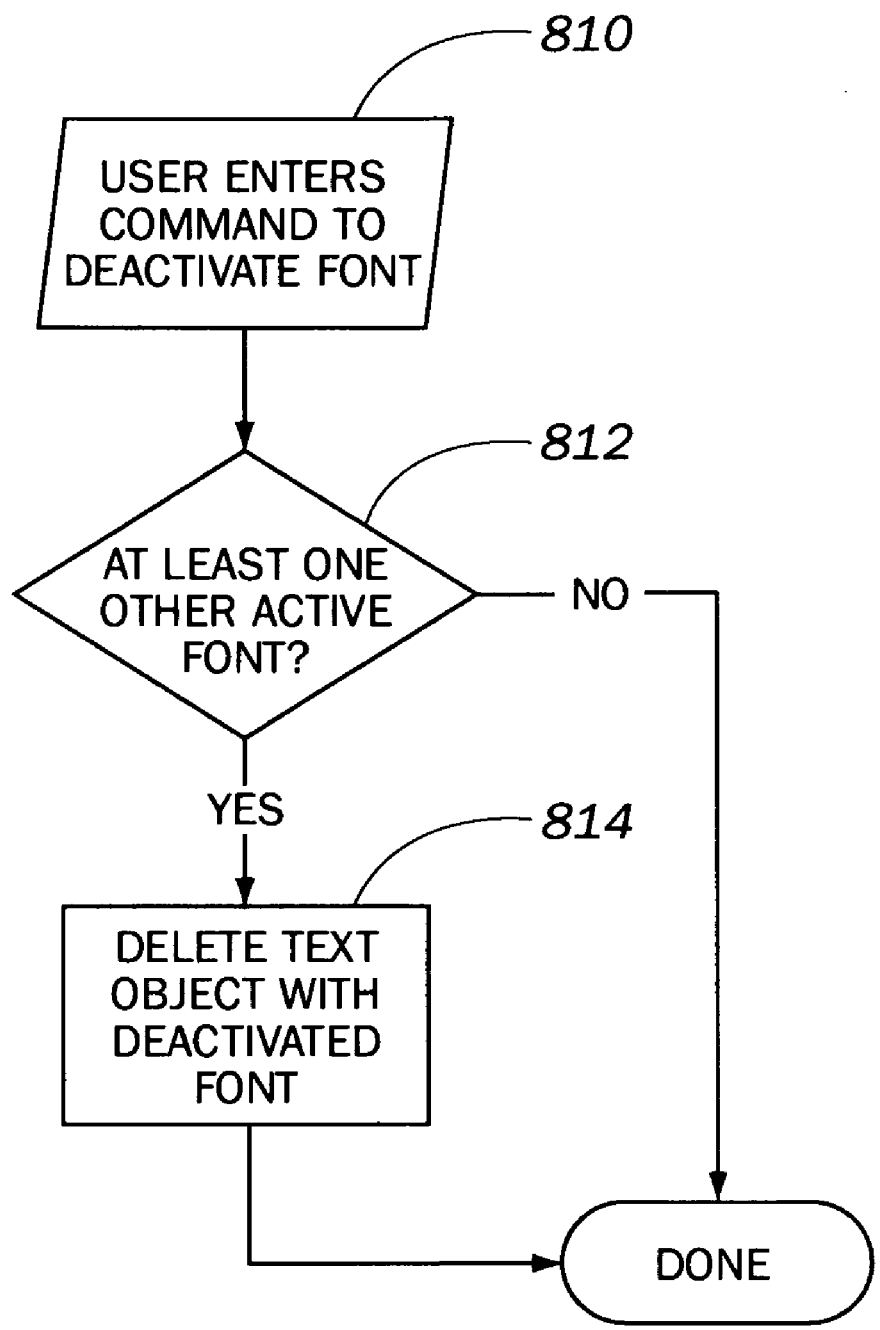
FIG. 8 is a flow diagram illustrating a process of deleting a text object from a unit of composite type with multiple-color characters.

The user may in certain cases deactivate an already active font. As shown in FIG. 8, the user deactivates a font by double-clicking its name, in the palette 410, using the mouse 116 (step 810). The layer font manager 126 will first determine if any other fonts are active (step 812); if only one font is active ("NO" branch of step 812), then the layer font manager 126 will not delete the selected text object. If at least one other font is active ("YES" branch of step 812), however, the layer font manager 126 will then delete the text object assigned the deactivated font (step 814). Any other copy, or copies, which had been grouped with the deleted item will remain unchanged.

Managed Groups

If the user creates a grouped stack of text objects, as described above, and then (after working with other objects in a document, e.g.) selects that group anew, the layer font manager 126 will recognize the group as a managed group. The group of text objects shown in FIG. 7A and FIG. 7B illustrates one example of a managed group.

Figure 9:
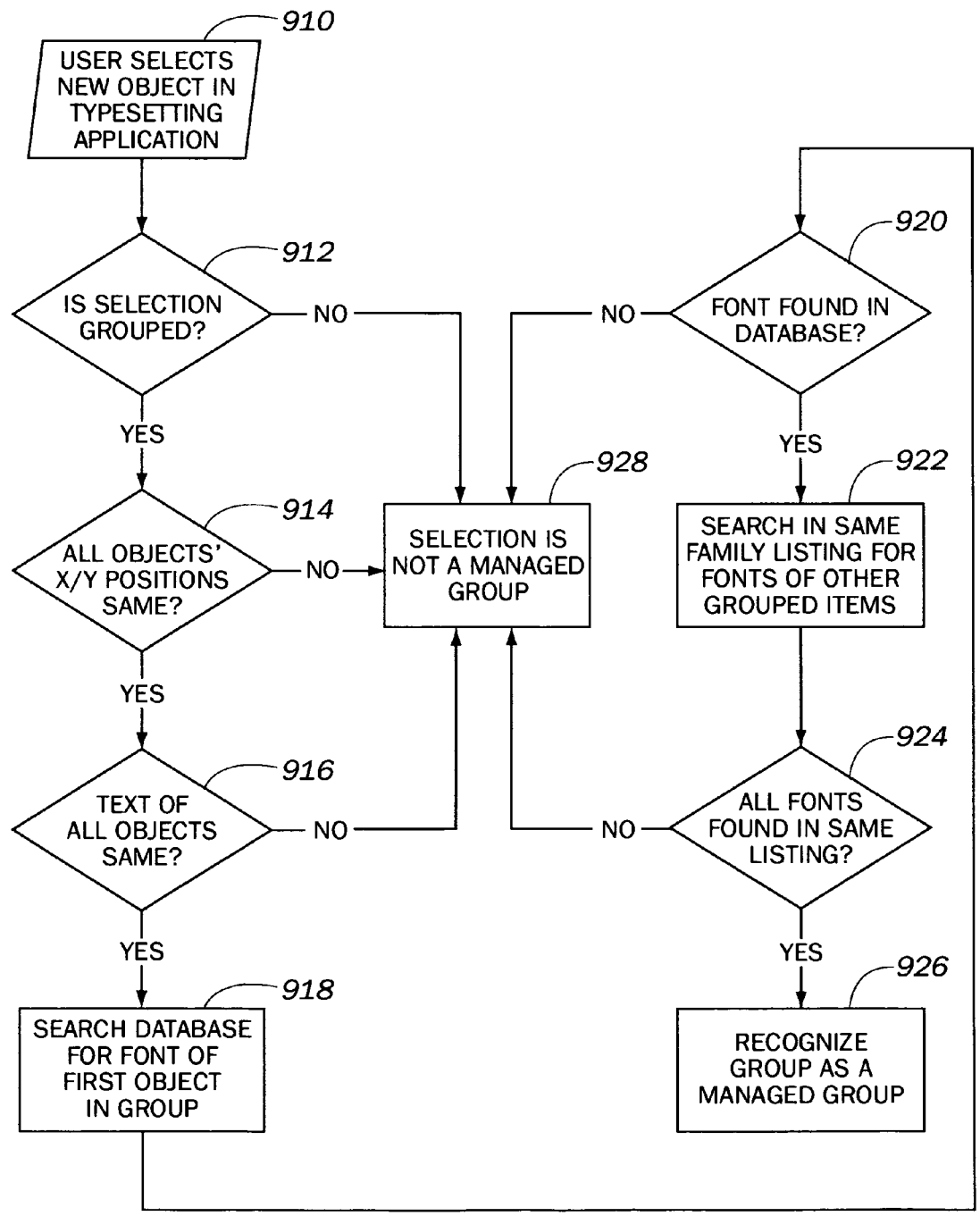
FIG. 9 is a flow diagram illustrating a process of recognizing a unit of composite type with multiple-color characters.

The layer font manager 126 will, in one embodiment, recognize managed groups by examining certain properties of any object selected in the typesetting application 122. FIG. 9 depicts the steps in this process. After the user has selected a new object (step 910), the layer font manager 126 will determine whether or not the selected object is, or belongs to, a group (step 912). If so, the layer font manager 126 will next compare each of the grouped objects' X/Y coordinates within the document 124 (step 914). If the coordinates match, then the layer font manager 126 will compare the items' text (step 916).

If the text of all objects in the group matches ("YES" branch of step 916), the layer font manager 126 will next compare the font of the first object in the group with the database 310 (step 918). If the font's name is listed in the database 310 ("YES" branch of step 920), the layer font manager 126 will then search within the same family listing 312 for the names of the other fonts present in the group (step 922). If all fonts present in the group are also present in the same family listing 312 ("YES" branch of step 924), then the layer font manager 126 will recognize that group as a managed group (step 926). If any of these tests return a "no," then the layer font manager 126 will determine that the selection is not a managed group (step 928).

In another embodiment, the layer font manager 126 might append a non-visible "tag" to each managed group that it creates within a document 124. In this embodiment, the layer font manager 126 would identify managed groups by checking for and recognizing the tag data, rather than by the method described above.

Managed Group Consistency

To simulate a single, multiple-color text object, the layer font manager 126 will maintain consistent text and typographic settings among the multiple, single-color text objects in a managed group.

In a typical typesetting application, when a user applies a new typographic setting (e.g. point size), all selected text objects will be updated with the new setting. Thus, if a group of text objects is selected, the new setting will automatically apply to all objects in the group. If one specific object is selected from an ordinary group, however, as is necessary to make changes to text or kerning, then editing will normally apply only to the selected object, rather than to all of the grouped objects.

Figure 10:
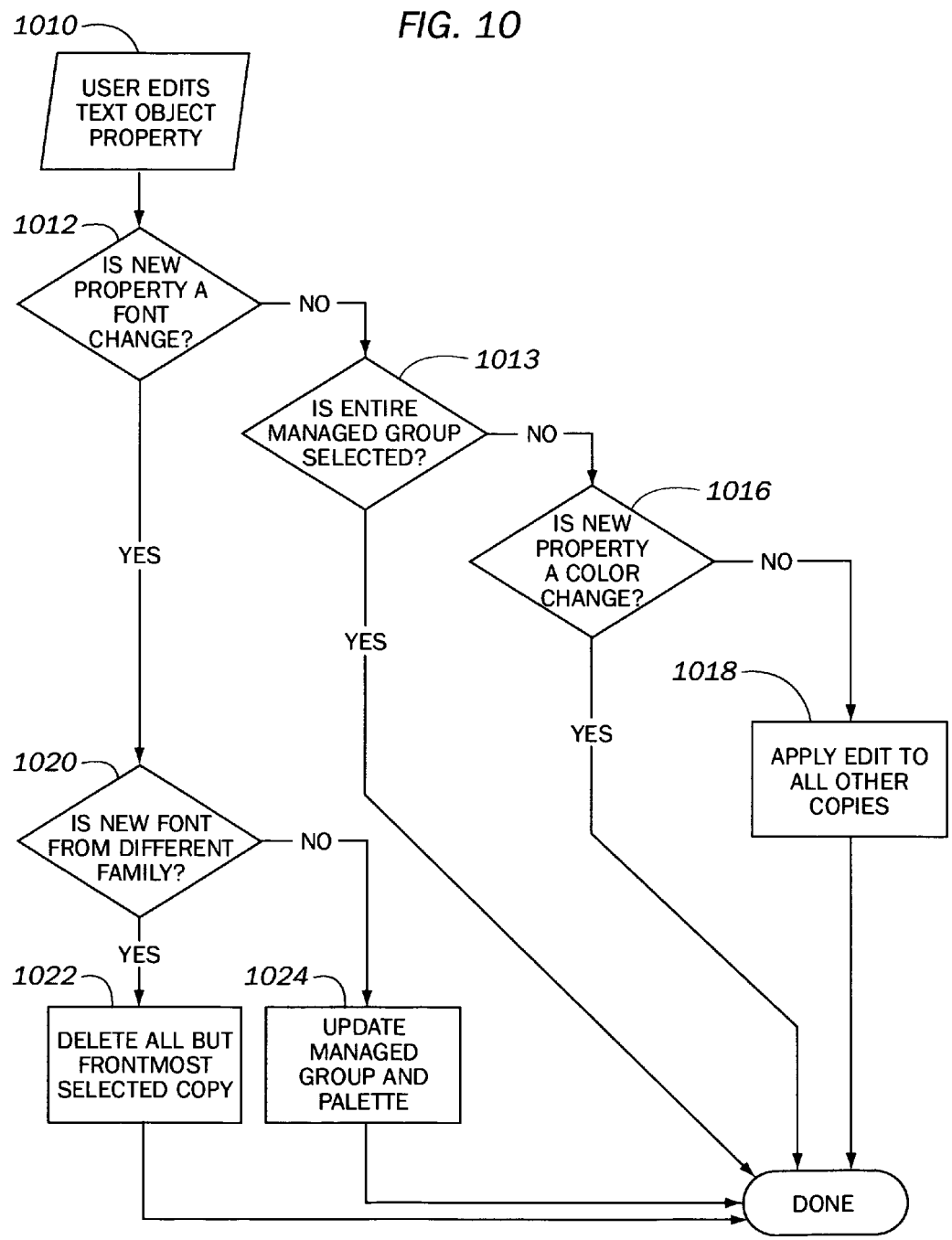
FIG. 10 is a flow diagram illustrating a process of maintaining consistent text and typographic settings among components of a unit of composite type with multiple-color characters.

If the user selects a specific object from a managed group, however, the layer font manager 126 will apply any text or typographic changes made by the user to all objects in the group, unless the changes are made to font or color. The layer font manager 126 will, likewise, update the size or shape of text boxes in a managed group if the user makes such changes to one item within such a group. FIG. 10 depicts this process.

When a user applies a change (step 1010) to all or part of a managed group, the layer font manager 126 will first determine whether or not the change is the selection of a different font. If the new property is not a font change ("NO" branch of step 1012) and the entire managed group is selected ("YES" branch of step 1013), changes will automatically apply to all objects in the group per normal behavior of a typesetting application.

If only one or some of the copies are selected from the managed group ("NO" branch of step 1013), and the new property is a color change ("YES" branch of step 1016), then the new color will only apply to the selected copy or copies. Changes to any property other than font or color will be applied to all objects in the managed group, selected and unselected (step 1018); this will include text changes, kerning and changes to the size or shape of a text box.

If the user chooses a font from the font menu of the typesetting application 122 while working with a managed group ("YES" branch of step 1012), the layer font manager 126 will first determine whether or not the new font belongs to the family of fonts already present in the managed group (step 1020).

If the new font is from a different font family ("YES" branch of step 1020), the layer font manager 126 will reduce the group to a single object, deleting all but the frontmost selected copy (step 1022). The remaining text object will be set in the new font.

Figure 11:
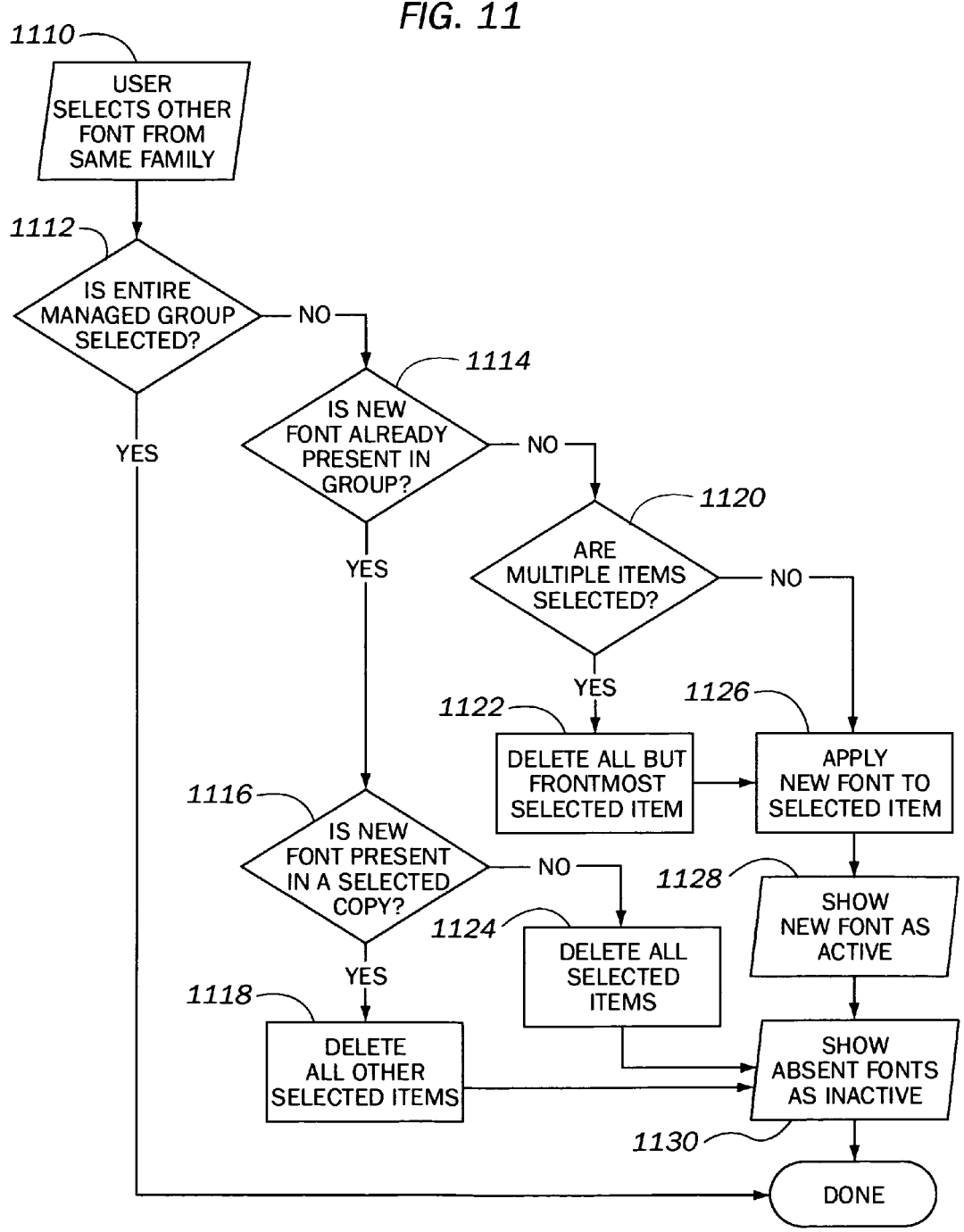
FIG. 11 is a flow diagram illustrating a process of revising a unit of composite type with multiple-color characters when different fonts, from within the font family used in the composite type, are applied to part or all of the composite unit.

If the new font is from the same family of fonts already present in the group ("NO" branch of step 1020), the layer font manager 126 will update the group and the palette (step 1024); FIG. 11. depicts this process in further detail.

Same-family Font Changes

If the user selects a font from the font menu of the typesetting application 122 while working with a managed group, and the new font belongs to the family of fonts already present in the group (step 1110), the group will remain unchanged if the entire group is selected ("YES" branch of step 1112).

If only part of the managed group is selected ("NO" branch of step 1112), however, the layer font manager 126 will determine whether or not the newly-selected font is already active somewhere in the group (step 1114).

If the newly-selected font is already active, and is present in a currently-selected copy ("YES" branch of step 1116), then all other selected copies, if any, will be deleted (step 1118). The fonts of any deleted copies will then appear in the palette 410 as inactive (step 1130).

If, however, the newly-selected font is present in a copy which is not selected ("NO" branch of step 1116), then the layer font manager 126 will delete all of the selected copies (step 1124). The fonts of the deleted copies will then appear in the palette 410 as inactive (step 1130).

If the user has selected a new font from the family of fonts already present in the group, but that specific new font is not currently active anywhere in the group ("NO" branch of step 1114), then the layer font manager 126 will make the new font active.

If the user has selected only one copy from the managed group ("NO" branch of step 1120), then the layer font manager 126 will simply apply the newly-selected font to that copy (step 1126). The palette 410 will then show the selected copy's new font as an active item 412 (step 1128), and its previous font as an inactive item 414 (step 1130).

If however the user has selected multiple copies from the managed group ("YES" branch of step 1120), rather than only one, then the layer font manager 126 will delete all but the frontmost selected copy (step 1122). The new font will apply to the remaining selected copy (step 1126), and will appear in the palette as active (step 1128) while the deleted objects' fonts will appear inactive (step 1130).

Selections Within a Group

Figure 12:
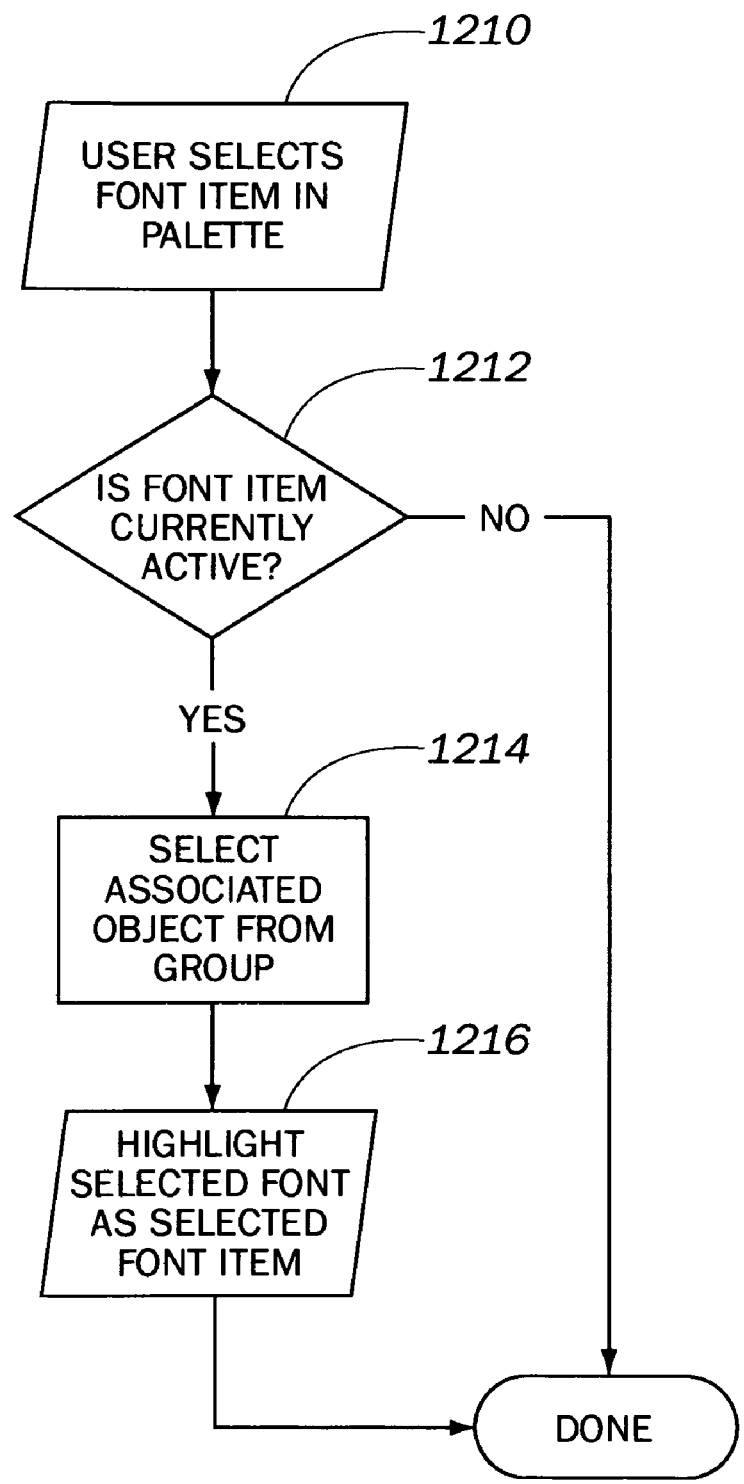
FIG. 12 is a flow diagram illustrating a process of selecting a specific text object from a unit of composite type based upon user input.

To change the specific color value of a color variable in composite layer font text, the user must first select the appropriate copy of the text, i.e. the copy set in the font whose glyphs comprise that color variable. Because copies of text in a managed group will be stacked directly over one another, it would normally be difficult for the user to select specific items beneath the top of the stack. The layer font manager 126 will permit easier experimentation with color combinations by assisting the user in selecting specific copies from within a group. FIG. 12 depicts this process.

While working with a managed group, the user may select a specific object from that group by selecting a font listed in the palette 410 (step 1210). If the selected font is active ("YES" branch of step 1212), then the layer font manager 126 will select from the group the line or block of text which is assigned that font (step 1214). The user may then easily assign different color values, as well as functions such as transparency or blurring which may be provided by the typesetting application 122, to the characters of the text without having to break apart the group.

Finally, as noted previously the palette 410 will indicate when one or more specific objects are selected, from within a managed group, by highlighting the font of each selected object as a selected font item 418 (step 1216).

In another embodiment of the invention the layer font manager 126 might, instead of selecting a text object from within the composite unit, select the text within that object. This embodiment would accommodate typesetting applications, such as Quark XPress™, which require the user to select text itself with a cursor, rather than selecting a text object, in order to apply settings such as text color.

Reordering a Group

As existing layer font families are generally designed for use in a specific order, the database 310 will record each family's fonts per the layering order recommended by their respective designer. In some cases, however, the user may wish to experiment with alternative layer orders (possibly in combination with transparency settings, e.g.) to develop novel graphic effects.

By selecting a specific text object from within a managed group via the palette 410, as described previously, the user will be able to change its relative place in the group using "bring forward" and "send backward" commands typically provided by a typesetting application 122.

Figure 13:
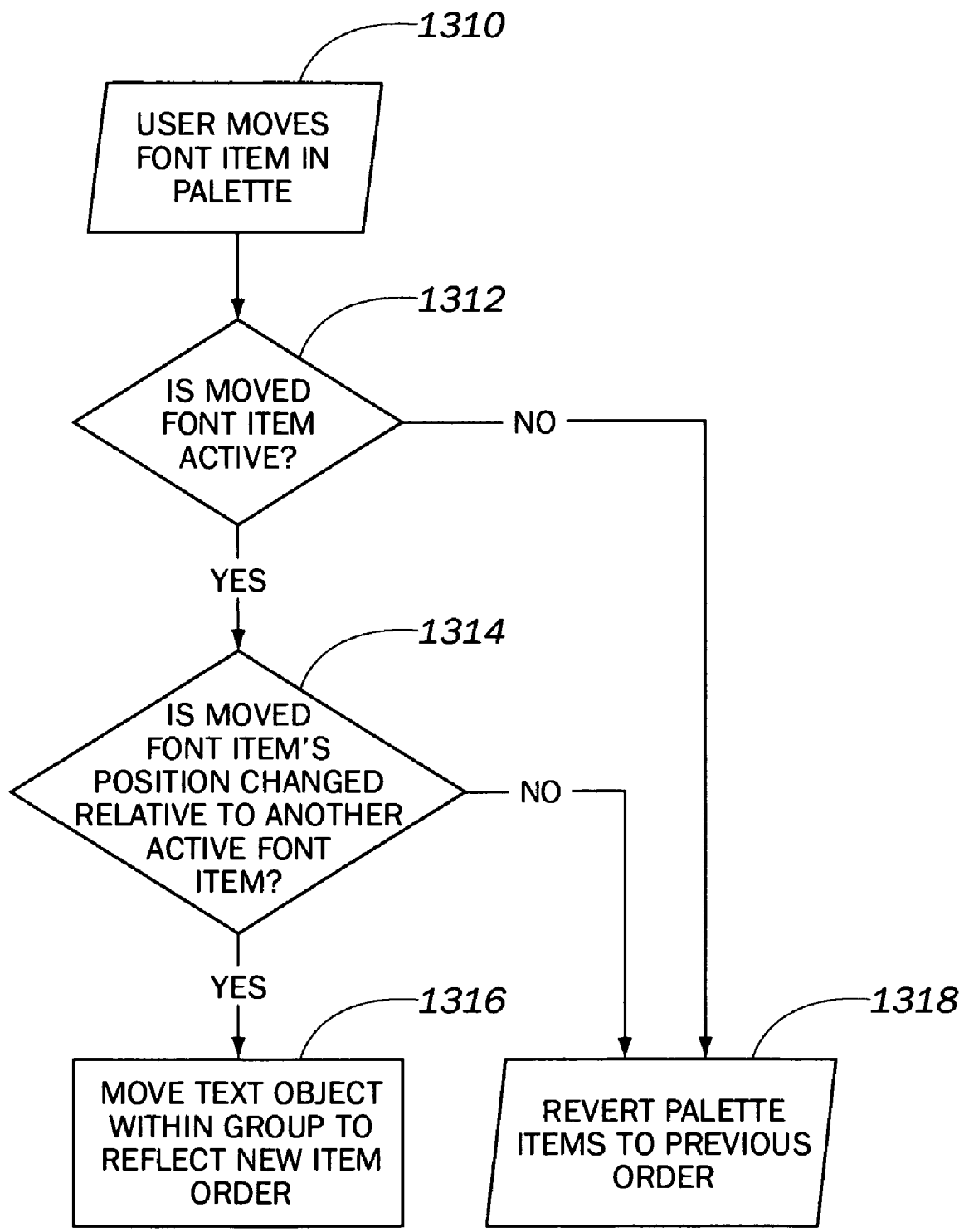
FIG. 13 is a flow diagram illustrating a process of determining whether or not to reorder text objects within a unit of composite type with multiple-color characters.

In one embodiment of the invention, however, the user may also reorder copies in a group simply by manipulating items within the palette 410. FIG. 13 depicts the steps of this process. In this embodiment, upon selecting one active font item 412 and keeping the mouse button 117 pressed down, the user may drag that font item higher or lower within the palette 410 (step 1310).

If the user releases an active font item 412 ("YES" branch of step 1312) at a different point, relative to other active items ("YES" branch of step 1314), the layer font manager 126 will reorder the text objects within the associated group, to reflect the new item order as depicted in the palette 410 (step 1316). If the user releases the selected item at a point in the palette 410 such that its position, relative to other active items, has not changed ("NO" branch of step 1314), then the layer font manager 126 will restore the previous item order (step 1318) and leave the associated group unchanged.

By either of the methods described above, the user may create a managed group with fonts represented in an order which differs from the default order recorded for their family in the database 310. In one embodiment of the present invention, the layer font manager 126 will reorganize how items are displayed in the palette 410 if such a reordered managed group is selected. Instead of listing fonts per the default order, the palette 410 will first list all active font items 412 per the order in which they are present in the selected group. Below that, all inactive font items 414 will be listed per the default order.

In another embodiment, the layer font manager 126 might tag each managed group as suggested previously, and link, to the tag of each group that has been reordered, a copy of the relevant font family listing 312. Within these family listing copies, the layer font manager 126 would record each change made to the order of items in the tagged group. In this embodiment, the user would be able to reorder items in the palette 410 in any way, without regard to items being active or inactive. The palette 410 would then, for any group tagged with a listing copy, display items in the order recorded in that copy.

Text Box Embellishments

In one embodiment of the invention, the layer font manager 126 will include functions to permit composite, multiple-color text with a colored background, border, and/or similar properties.

Figure 14:
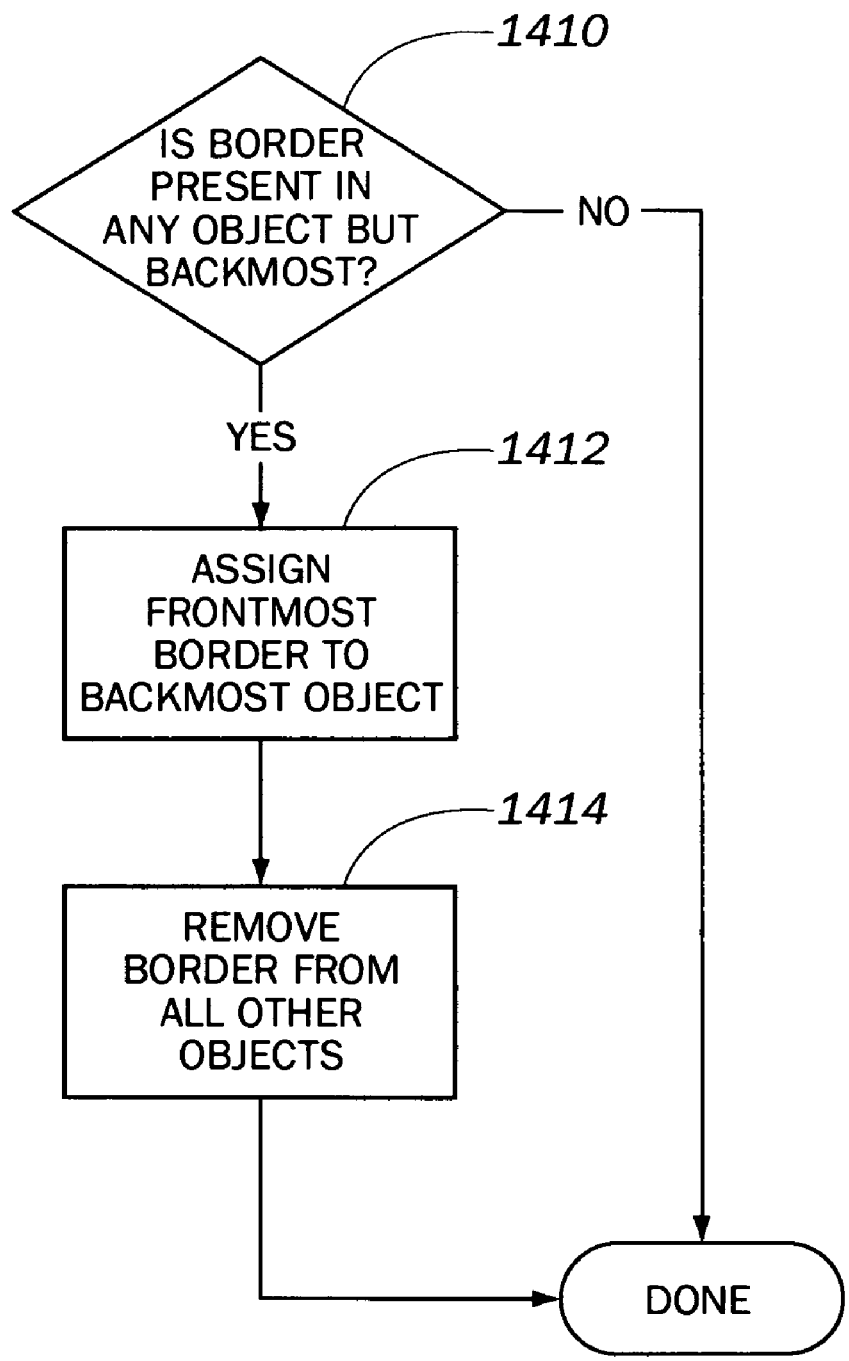
FIG. 14 is a flow diagram illustrating a process of managing a decorative border property within a unit of composite type with multiple-color characters.

If a text box with a border is present in a managed group, then the layer font manager 126 will cause the border to apply only to the backmost copy in the group. All other items in a managed group will be borderless. The process of managing border properties is shown in FIG. 14.

Any time that an object which is not the backmost within a managed group possesses a border ("YES" branch of step 1410), the layer font manager 126 will assign the border of the frontmost bordered object to the backmost copy within the group (step 1412). The layer font manager 126 will then remove the border from all other objects in the group (step 1414).

This process will also apply to text box background colors, corner effects, drop shadows, and other like decorative settings.

Minimalist-Interface Embodiment

Figure 15A:
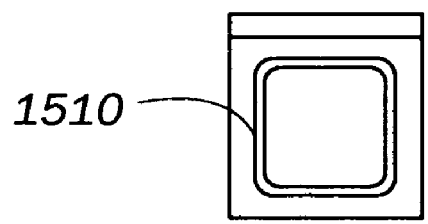
FIG. 15A is a user interface permitting the automated assembly of composite type with multiple-color characters, using multiple text objects.
Figure 15B:
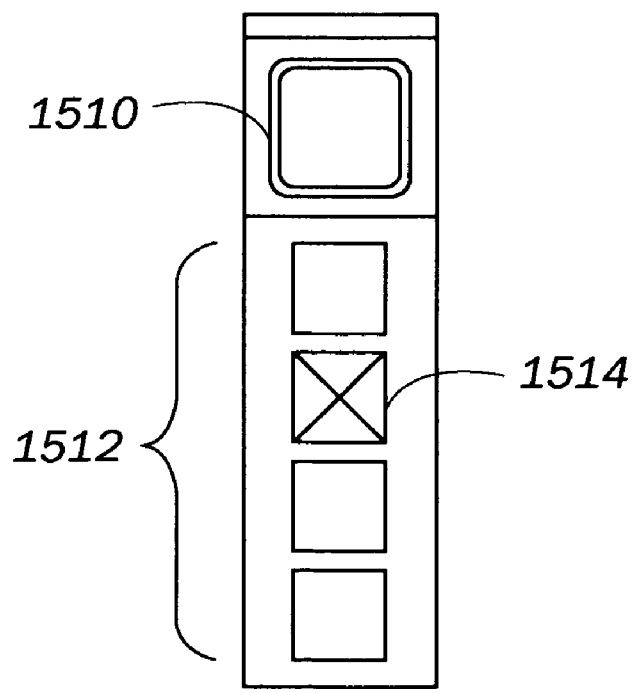
FIG. 15B is an expanded user interface for displaying information about, and manipulating, text objects set in layer fonts intended for the creation of composite type with multiple-color characters.

Another embodiment of the present invention would replace the palette 410 with a simplified and more compact interface, shown in FIG. 15A and FIG. 15B. In this embodiment, the layer font manager 126 would display a simple on-or-off interface, such as a button 1510, any time that a text object set in a layer font is selected. The layer font manager will recognize layer fonts using the database, as described previously and as illustrated in FIG. 5.

Figure 16:
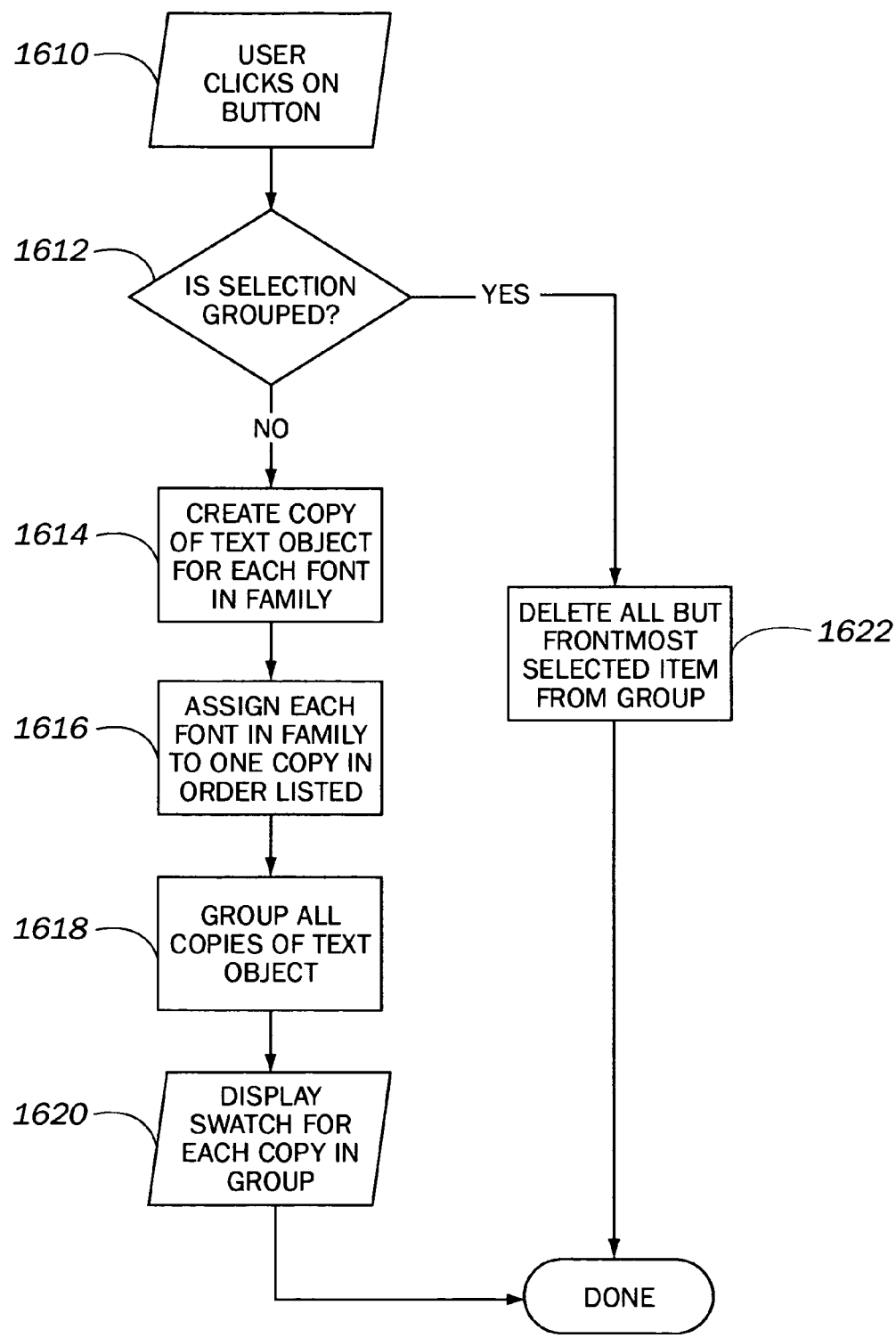
FIG. 16 is a flow diagram illustrating a process of automatically assembling, or disassembling, a unit of composite type with multiple-color characters.

In FIG. 16 we see a flow diagram, depicting a process of automatically building or deleting groups of stacked text objects set in layer fonts. By clicking on the button 1510 (step 1610), via the mouse 116, the user will prompt the layer font manager 126 to create copies of the selected text object (step 1614). The layer font manager 126 will set each copy in a different font, from the font family of the original object (step 1616). The layer font manager 126 will, by this means, produce a stack of text objects in which every font from the relevant font family is represented. After creating such a stack of text objects, the layer font manager 126 will group them (step 1618), creating a managed group as described previously.

In FIG. 15B we see an expanded interface, to be displayed by the layer font manager 126 while a managed group is selected. The interface will, at these times, display adjacent to the button 1510 a linear series of swatches 1512 (step 1620). Each swatch will correspond to one text object from the managed group, and will depict the color of the text within the corresponding text object. Swatches will be arranged in the same order as the corresponding objects within the managed group, e.g. the first swatch will represent the frontmost object in the managed group.

By clicking on one or more of the swatches 1512, the user will be able to select the corresponding individual text object(s) from a managed group, and then assign new color values to the object(s).

This embodiment of the invention will maintain consistent text and typographic settings, and manage decorative properties, within a managed group as described previously. The user will also be able to reorder objects within a managed group by rearranging the corresponding swatches.

This embodiment will not enable activation or deactivation of individual fonts. By assigning a null color 1514 to a text object, however, the user will be able to eliminate that object's glyphs from the visible composite text, though the object will remain part of the group. By clicking the button 1510 while a group is selected ("YES" branch of step 1612), the user will prompt the layer font manager 126 to delete all of the grouped items but the frontmost selected copy (step 1622).

Universal Font Management Embodiment

Another embodiment of the invention might omit the database 310, and instead display the entire family of the currently selected font, for any font. This embodiment would rely on the user's judgment, rather than a master list, in order to determine whether or not a given font family is appropriate for use in composite multiple-color text.

Some typesetting applications examine "family name" data, recorded in font files, in order to group fonts by family in font menus; one such application is Adobe InDesign™, sold by Adobe Systems Inc. of San Jose, Calif. The layer font manager 126 would display fonts in families based on the font menu of such an application. If this embodiment of the invention employed a typesetting application 122 which does not organize font menus by family, the layer font manager 126 itself would examine available fonts, directly, to generate family group listings.

This embodiment of the invention would omit steps 918 and 920 when examining a selected object to recognize a managed group.

Conclusions, Further Ramifications and Scope

The reader will see that at least one embodiment of the present invention provides an efficient, user-friendly system for setting and managing type with multiple color variables in individual characters. It will be further appreciated that this system offers significant practical advantages over existing approaches to multiple-color type.

The embodiments of the invention, disclosed previously, have been presented for the purposes of illustration and description. They are not intended to be exhaustive or to limit the invention to any precise form described. It will be appreciated that various changes, in addition to those expressly stated herein, can be made without departing from the spirit and scope of the invention. For example, in one embodiment, the layer font manager 126 might delete and replace other copies in the managed group after one copy is edited, rather than applying the editing to all existing copies.

Accordingly, the invention is limited only by the following claims and equivalents thereto.

I claim:

1. A desktop publishing system, comprising:
    a personal computer;
    a typesetting application program;
    a plurality of fonts from a layer knit family;
    a layer font manager program, being capable of:
        presenting in said typesetting application, upon selection of a text object by a user, a user interface, the user interface being in a window;
        creating a copy of said text object in alignment with said text object upon said user employing said user interface, the copy being in a second font, the second font being from the font family of the font of said text object;
        binding together said text object and said copy of said text object in a composite unit;
    wherein the layer font family is a plurality of layer font families, and further including a list of individual ones of said plurality of fonts from said font family of the font of said text object, the list being presented in said window, and by which said user may direct said layer font manager program to create said copy of said text object in a specific font based on a selection from said list by said user; and
    wherein said layer font manager program, in response to selection by said user of an individual font within said list when the selected font is already present in said composite unit, proceeds to select from said composite unit the individual object assigned said selected font.

2. A desktop publishing system, comprising:
- a personal computer;
- a typesetting application program;
- a plurality of fonts from a layer font family;
- a layer font manager program, being capable of:
  - presenting in said typesetting application, upon selection of a text object by a user, a user interface, the user interface being in a window;
  - creating a copy of said text object in alignment with said text object upon said user employing said user interface, the copy being in a second font, the second font being from the font family of the font of said text object;
  - binding together said text object and said copy of said text object in a composite unit;
- wherein the layer font family is a plurality of layer font families, and further including a list of individual ones of said plurality of fonts from said font family of the font of said text object, the list being presented in said window, and by which said user may direct said layer font manager program to create said copy of said text object in a specific font based on a selection from said list by said user; and
- wherein said layer font manager program moves an object within said composite unit, the movement of said object being based upon movement of the respective font of said object, within said list, by said user.

* * * * *